(12) United States Patent
Ferri et al.

(10) Patent No.: US 8,098,330 B2
(45) Date of Patent: Jan. 17, 2012

(54) MAPPING OF PRESENTATION MATERIAL

(75) Inventors: Richard Ferri, Ulster Park, NY (US); Matthew G. Ferri, Ulster Park, NY (US)

(73) Assignee: International Business Machines Corporation, Armonk, NY (US)

(*) Notice: Subject to any disclaimer, the term of this patent is extended or adjusted under 35 U.S.C. 154(b) by 1404 days.

(21) Appl. No.: 11/460,891

(22) Filed: Jul. 28, 2006

(65) Prior Publication Data

US 2008/0111922 A1    May 15, 2008

(51) Int. Cl.
*H04N 5/445* (2011.01)
*H04N 9/74* (2006.01)
*H04N 9/76* (2006.01)
*G11B 27/00* (2006.01)
*G06F 3/00* (2006.01)

(52) U.S. Cl. ........ 348/564; 348/584; 348/586; 348/598; 386/278; 715/723

(58) Field of Classification Search .................. 348/564, 348/584, 586, 598; 386/52
See application file for complete search history.

(56) References Cited

U.S. PATENT DOCUMENTS

| | | | |
|---|---|---|---|
| 4,811,084 A | | 3/1989 | Belmares-Sarabia et al. |
| 5,270,820 A | * | 12/1993 | Fellinger ..................... 348/586 |
| 5,329,369 A | * | 7/1994 | Willis et al. ................. 348/556 |
| 5,566,251 A | * | 10/1996 | Hanna et al. ................. 382/284 |
| 5,576,769 A | * | 11/1996 | Lendaro ....................... 348/511 |
| 5,657,095 A | * | 8/1997 | Yoshida et al. ............... 348/584 |
| 5,668,605 A | * | 9/1997 | Nachshon et al. ............ 348/584 |
| 5,731,846 A | * | 3/1998 | Kreitman et al. ............. 348/581 |
| 5,764,306 A | * | 6/1998 | Steffano ....................... 348/586 |
| 5,914,748 A | * | 6/1999 | Parulski et al. .............. 348/239 |
| 5,923,791 A | * | 7/1999 | Hanna et al. ................. 382/295 |
| 5,940,139 A | * | 8/1999 | Smoot .......................... 348/584 |
| 5,953,076 A | * | 9/1999 | Astle et al. .................... 348/584 |
| 6,020,931 A | * | 2/2000 | Bilbrey et al. ................ 348/584 |
| 6,052,648 A | | 4/2000 | Burfeind et al. |
| 6,075,905 A | * | 6/2000 | Herman et al. ............... 382/284 |
| 6,326,969 B1 | | 12/2001 | Helman et al. |
| 6,361,173 B1 | * | 3/2002 | Vlahos et al. .................. 353/97 |
| 6,538,396 B1 | * | 3/2003 | Vlahos et al. ................ 315/292 |
| 6,616,281 B1 | * | 9/2003 | Vlahos et al. .................. 353/28 |

(Continued)

OTHER PUBLICATIONS

"Traveling Mattes", [online][retrieved Jul. 27, 2006] http://entertainment.howstuffworks.com/blue-screen2.htm, pp. 1-6.

(Continued)

*Primary Examiner* — Brian Yenke
(74) *Attorney, Agent, or Firm* — Rabindranath Dutta; Konrad Raynes and Victor LLP (57) ABSTRACT

Provided are a method, system, and article of manufacture for generating a video output by combining a first video input and a second video input. A first input image is accessed from the first video input and a second input image is accessed from the second video input, wherein the second input image includes a selected element recorded in front of a monochromatic background. A first region and a second region are generated from the first input image. An output image that includes the first region and the second region with a gap separating the first region from the second region is generated. The selected element is placed at least over the gap in the output image, wherein predetermined areas of the first region and the second region remain visible in the output image. The output image is included in the video output.

20 Claims, 10 Drawing Sheets

U.S. PATENT DOCUMENTS

| | | | |
|---|---|---|---|
| 6,731,825 B1 | 5/2004 | Acampora et al. | |
| 6,961,061 B1 * | 11/2005 | Johnson et al. | 345/473 |
| 7,024,039 B2 * | 4/2006 | Simard et al. | 382/195 |
| 7,054,479 B2 * | 5/2006 | Aucsmith et al. | 382/154 |
| 7,095,450 B1 * | 8/2006 | Holmes et al. | 348/586 |
| 7,111,940 B2 * | 9/2006 | Vlahos | 353/28 |
| 7,116,342 B2 * | 10/2006 | Dengler et al. | 345/630 |
| 7,206,029 B2 * | 4/2007 | Cohen-Solal | 348/565 |
| 7,224,404 B2 * | 5/2007 | An et al. | 348/584 |
| 7,231,651 B2 * | 6/2007 | Pong | 725/32 |
| 7,253,821 B2 * | 8/2007 | Shimizu | 345/619 |
| 7,292,284 B2 * | 11/2007 | Kim | 348/564 |
| 7,375,769 B2 * | 5/2008 | Yui | 348/584 |
| 7,460,731 B2 * | 12/2008 | Senftner et al. | 382/284 |
| 7,616,264 B1 * | 11/2009 | Greenberg | 348/584 |
| 7,843,510 B1 * | 11/2010 | Ayer et al. | 348/584 |
| 2001/0014175 A1 * | 8/2001 | Tavor | 382/167 |
| 2004/0062439 A1 * | 4/2004 | Cahill et al. | 382/173 |
| 2004/0264767 A1 * | 12/2004 | Pettigrew | 382/162 |
| 2006/0197851 A1 * | 9/2006 | Vlahos | 348/239 |

OTHER PUBLICATIONS

Cai Lili., "Application of Virtual Studio Technology in News Live Broadcasting Programs", May 31, 2005, 3 pgs.

Zhao Wei., "Application of Virtual Studio in Television Programs", May 31, 2005., 3 pgs.

IBM China Ltd. Information Disclosure Statement, dated Oct. 17, 2008, citing China prior art, 2 pgs.

* cited by examiner

MAPPING OF PRESENTATION MATERIAL

BACKGROUND

1. Field

The disclosure relates to a method, system, and article of manufacture for the mapping of presentation material.

2. Background

In film, broadcast and cable television a technique referred to as the "blue screen technique" may be used to combine two or more separately captured video sequences into a single video sequence. The blue screen technique may record a scene with a monochromatic background, and then replace the monochromatic background with a different image or scene. While blue is a commonly used as the color of the monochromatic background, other colors may be used as the color of the monochromatic background.

In the blue screen technique, the monochromatic background color in a first video signal is removed and overlaid with content from a second video signal. This process may be also be referred to as "compositing" and may be performed via digital or analog techniques. There may be various ways of generating composite images from two video signals.

An example of the use of the bluescreen technique may be found in the display of a television news weatherman who appears to stand in front of a weather map. The weatherman is recorded while standing in front of a monochromatic screen and the recorded image of the weatherman standing in front of the monochromatic screen is combined with the weather map.

SUMMARY OF THE DESCRIBED EMBODIMENTS

Provided are a method, system, and article of manufacture for generating a video output by combining a first video input and a second video input. A first input image is accessed from the first video input and a second input image is accessed from the second video input, wherein the second input image includes a selected element recorded in front of a monochromatic background. A first region and a second region are generated from the first input image. An output image that includes the first region and the second region with a gap separating the first region from the second region is generated. The selected element is placed at least over the gap in the output image, wherein predetermined areas of the first region and the second region remain visible in the output image. The output image is included in the video output.

In certain additional embodiments, the first input image comprises a presentation material, wherein the second input image comprises a presenter standing in front of the monochromatic background, wherein the presenter is the selected element included in the second input image, wherein in the output image the presenter does not obscure the predetermined areas included in the presentation material, and wherein the first video input and the second video input are received by a computational device that generates the video output in real time.

In further embodiments, the presentation material is weather map and the presenter is a news weatherman.

In still further embodiments, the first region includes a first set of text and the second region includes a second set of text, and wherein the predetermined areas that remain visible in the output image include the first set of text and the second set of text.

In additional embodiments, the first input image is split into the first region and the second region based on physical features included in the first input image.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made.

In many situations, presenters may stand in front of a presentation material and point out various aspects of the presentation material. When a scene that includes the presentation material and a presenter is broadcast to an audience, the displayed video may show that the presenter is blocking some portion of the presentation material from the audience. For example, a weather forecaster may block some portions of a weather map from the audience.

Certain embodiments, allow a presenter to stand and move in front of a presentation material while the image of the presentation material is remapped in real time, such that no predetermined elements of the presentation material are blocked by the presenter. In certain embodiments, areas of text material are generated and mapped around a moving presenter in such a way that the text material always remain readable to a viewer.

Figure 1:
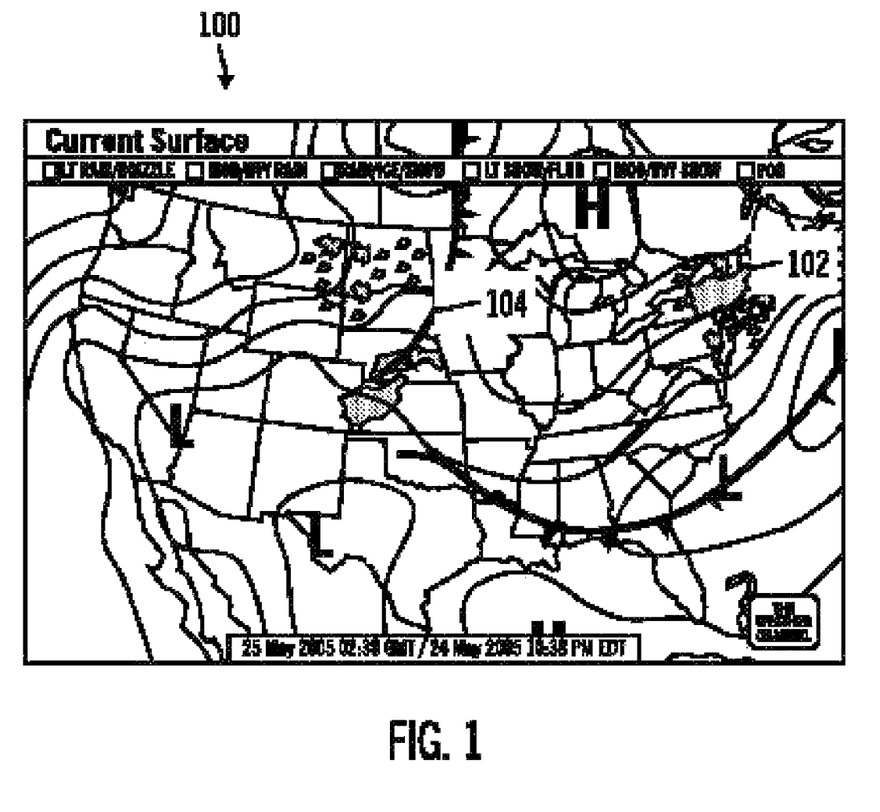
FIG. 1 illustrates an exemplary weather map that indicates details about a storm in the Northeast and a cold front in the Midwest, in accordance with certain embodiments.

FIG. 1 illustrates an exemplary weather map 100 that indicates details about a storm 102 in the Northeast and a cold front 104 in the Midwest, in accordance with certain embodiments. The exemplary weather map 100 illustrated in FIG. 1 may be an image of a first video input. For example, the exemplary weather map 100 may be a video feed from a national or regional weather center, where the video feed can be downloaded by a plurality of television stations.

Figure 2:
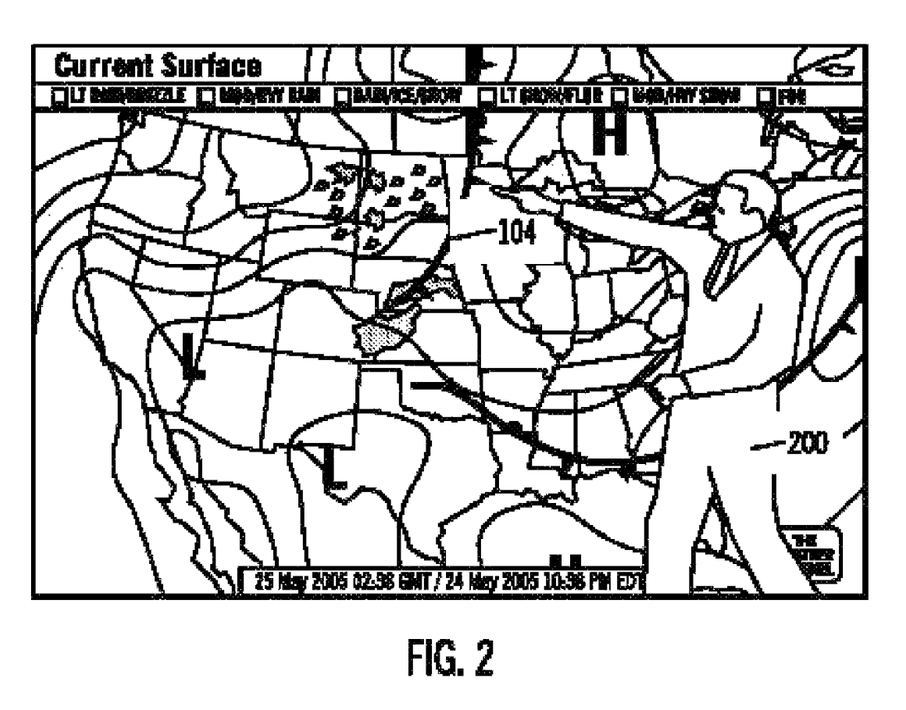
FIG. 2 illustrates a first position of an exemplary weather forecaster, wherein in the first position the exemplary weather forecaster blocks details about the storm in the Northeast.

FIG. 2 illustrates a first position 200 of an exemplary weather forecaster, wherein in the first position 200 the exemplary weather forecaster blocks details about the storm 102 in the Northeast. While the exemplary weather forecaster appears to be pointing at the cold front 104 in the Midwest, the storm 102 in the Northeast is no longer visible to the viewers.

Figure 3:
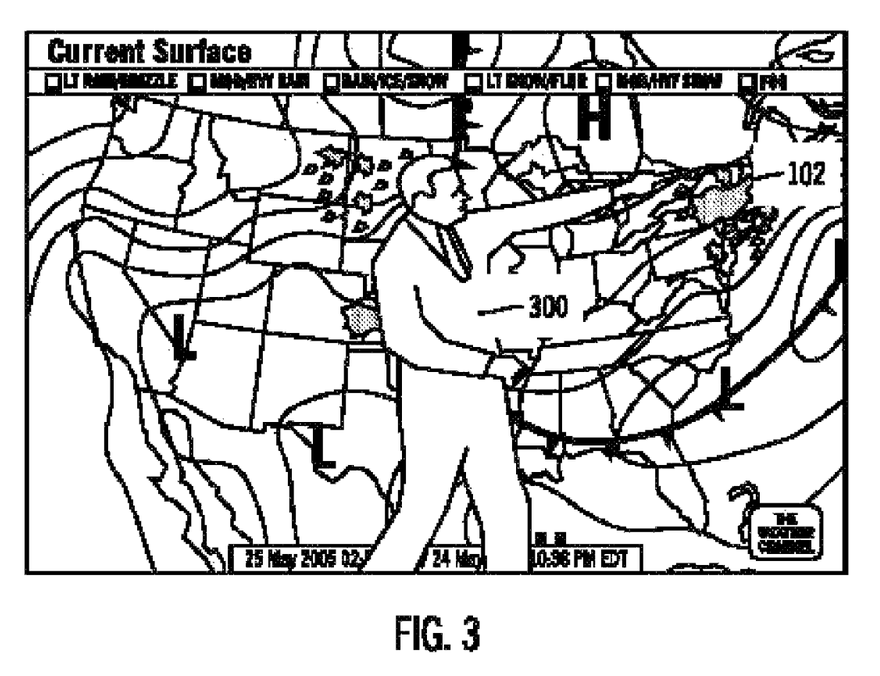
FIG. 3 illustrates a second position of an exemplary weather forecaster, wherein in the second position the exemplary weather forecaster blocks details about the cold front in the Midwest.

FIG. 3 illustrates a second position 300 of an exemplary weather forecaster, wherein in the second position 300 the exemplary weather forecaster blocks details about the cold front 104 in the Midwest. While the exemplary weather forecaster appears to be pointing at the storm 102 in the Northeast, the cold font 104 in the Midwest is no longer visible to the viewers.

Figure 4:
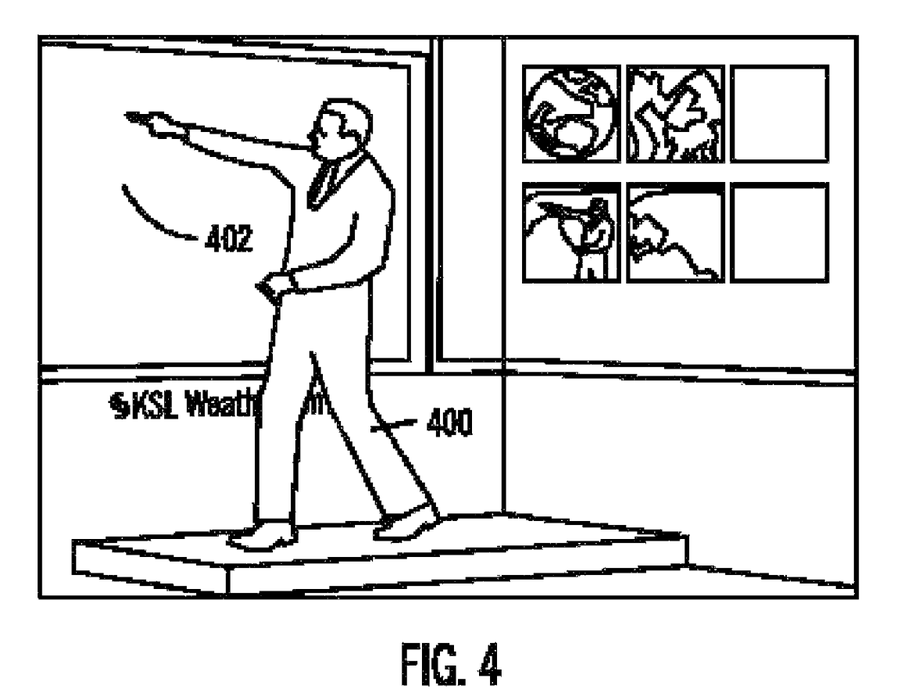
FIG. 4 illustrates an exemplary weather forecaster standing in front of a blue screen, in accordance with certain embodiments.
Figure 5:
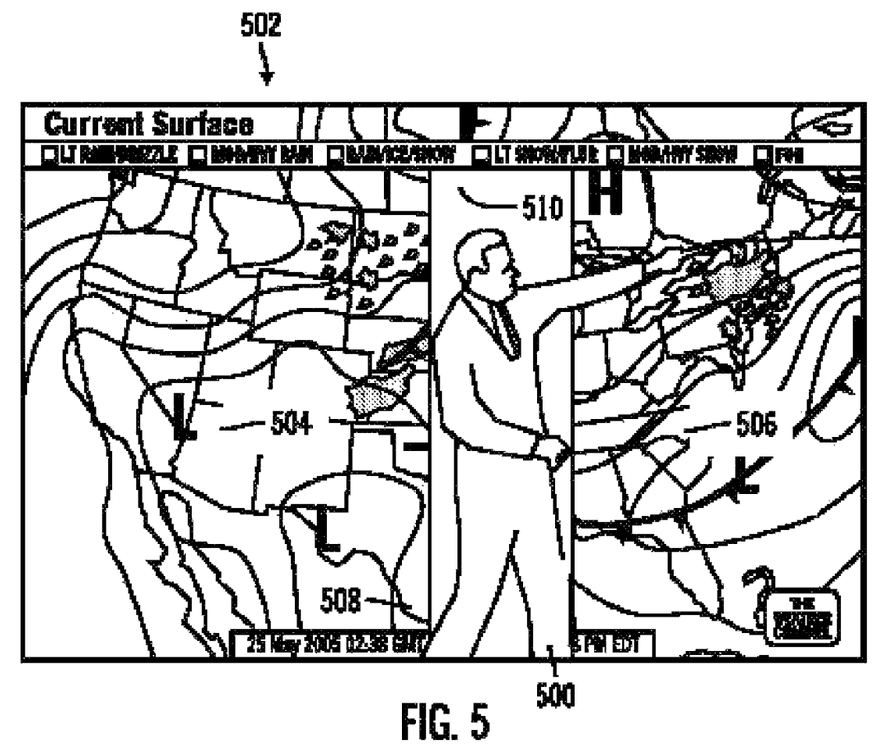
FIG. 5 illustrates an exemplary digital remapping of a presentation material, such as the weather map, around the presenter, in accordance with certain embodiments.

FIG. 4 illustrates exemplary weather forecaster 400 standing in front of a blue screen 402, in accordance with certain embodiments. In certain embodiments, a traveling matte is used in the blue screen technique in real time. The weather forecaster 400 stands in front of the blue screen 402 and special filters take the picture of the weather forecaster 400, to create a matte, i.e., a silhouette of the weather forecaster's figure. This silhouetted figure may be cast over a plate or an image, which includes the weather map 100. When these two pieces of film or digitized video are put together as shown in FIG. 5, it may appear that a weather forecaster 500 is actually standing in front of an actual weather map 502. Therefore, FIG. 5 illustrates an exemplary digital remapping of a presentation material, such as the weather map 100, around a presenter, such as the weatherman 500, in accordance with certain embodiments.

In certain embodiments the presentation material, such as the weather map 100, is digitally remapped around the presenter, such as the weather forecaster 500, in real time, such that no preselected features, such as storms, cold fronts, etc., of the weather map 100 are blocked from the viewer. As the weather forecaster 500 walks side to side, i.e., from east to west, or from west to east, the weather map 100 will dynamically remap around the weather forecaster 500, in such a way that no significant portion of the weather map 100 is blocked.

While the embodiments shown in FIG. 5 are especially applicable to graphics, such as weather maps, alternative embodiments could be applied for text presentations or presentations that include both text and graphics. Performing the remap in real time is feasible when the embodiments shown in FIG. 5 are implemented in computing devices having enough processing power and memory. Furthermore, certain existing devices for implementing blue screen techniques may be modified to implement the embodiments illustrated in FIG. 5, such that the remap is performed in real time.

Certain embodiments use a modification of the blue screen technique used currently in television production. The presenter, e.g., the weatherman 500, may be filmed in front of a blue screen 402, and the film of the presenter is laid over a film of the presentation material. However, in addition to prior art blue screen techniques, the presentation material in FIG. 5 is remapped and redrawn to the left 504 and right 506 of the presenter 500, dynamically, so that the presenter 500 will not block the presentation material 502.

In certain embodiments, as the presenter 500 moves during the presentation, the image will cause the presentation material to be dynamically remapped in real time to the left or right in such a way that the presenter 500 will not block the presentation material. In certain embodiments, the material to the right and left of the presenter 500 may need to be compressed to fit in the available screen size.

In the particular embodiment illustrated in FIG. 5, the entire weather map 100 may be displayed, in a slightly compressed version, to the left 504 and right 506 of the presenter 500. Significant details in the weather map 100 are preserved for viewing. For example, the southern tip of Texas 508 is visible in the weather map 502 of FIG. 5, but was blocked by the weather forecaster in FIG. 3.

In FIG. 5, a gap 510 is created between a first region situated to the left 504 and a second region situated to the right 506. The weather forecaster's 500 image is primarily placed in the gap 510 or alternatively the weather map is distributed to the left and the right of the gap 510.

In certain alternative embodiments, a graphic, such as a map, may be divided into the first and the second region by using physical features in the map. For example, natural boundaries, such as rivers, state boundaries, or land forms, such as mountains, may be used for dividing a map into the first and the second region. Certain embodiments allow a map to be segmented in a way that is natural for the viewer, while still allowing the operations to be performed in real time, as the presenter 500 moves across the presentation material.

Figure 6:
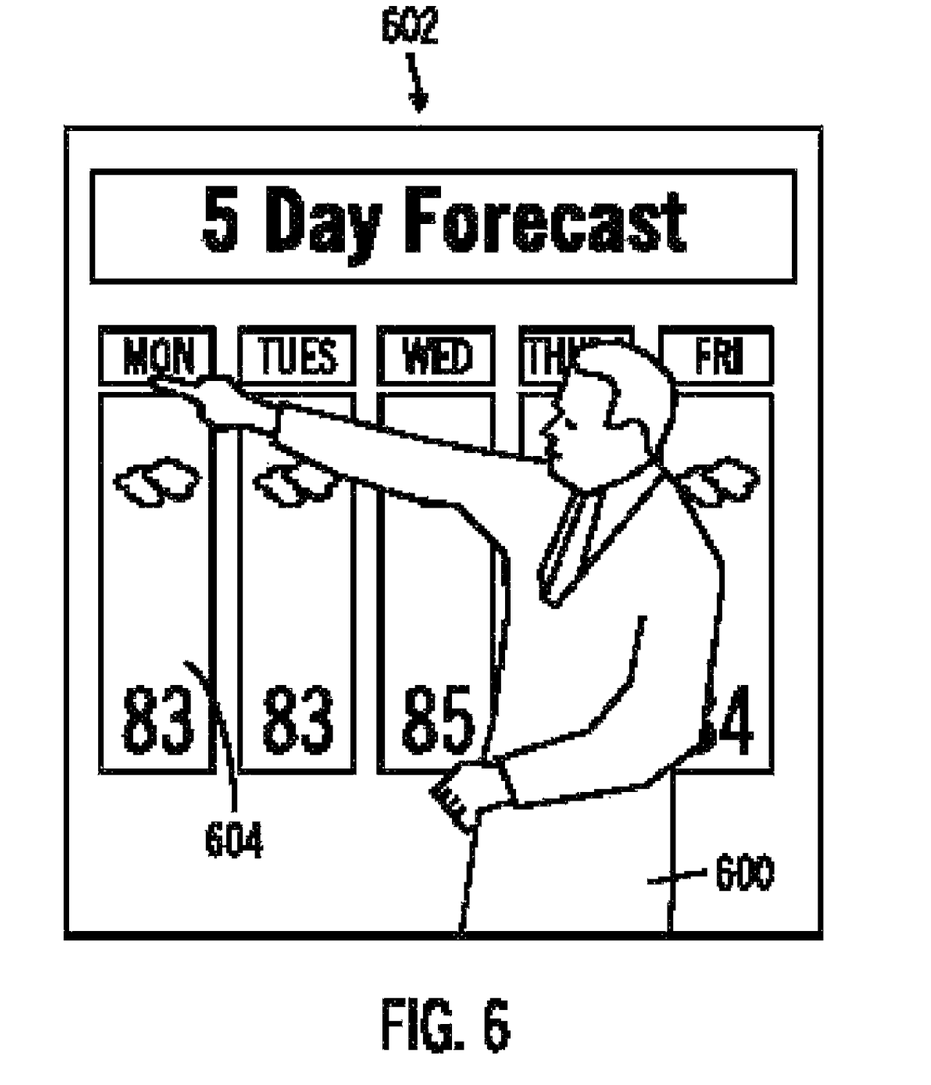
FIG. 6 illustrates an exemplary weather forecaster standing in front of a presentation that includes text, in accordance with certain embodiments.

FIG. 6 illustrates an exemplary weather forecaster 600 standing in front of a presentation 602 that includes text 604, in accordance with certain embodiments. When processing presentation material that includes text, certain blocks of text are moved logically in a way such that the text material is still readable by the audience. In FIG. 6, the weather forecaster 600, is blocking portions of several days, and all of Thursday. A viewer may prefer not to have any text obscured by the weather forecaster 600.

Figure 7:
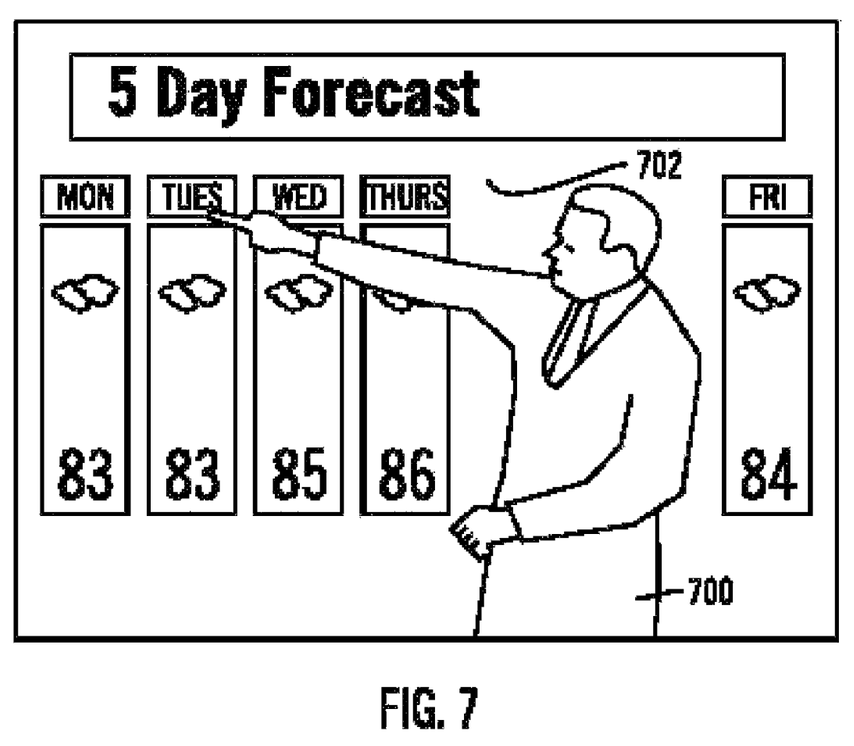
FIG. 7 illustrates an exemplary digital remapping of a presentation material that includes text, around the presenter, in accordance with certain embodiments.

FIG. 7 illustrates an exemplary digital remapping of a presentation material 602 that includes text, around the presenter 700, in accordance with certain embodiments. In certain embodiments, the days shown in FIG. 7 would be broken up into 5 chunks: Monday, Tuesday, Wednesday, Thursday and Friday. As the presenter 700 moves from left to right, or right to left, entire chunks will be pushed to his left or right, but chunks would never be divided. If the presenter 500 stands to the extreme right, all the chunks will be displayed on the left of the screen. If the presenter 500 stands to the extreme left, all the chunks will be displayed on the right of the screen. In FIG. 6 the weather forecaster 700 is shown placed mostly in the gap 702 between chunks representing daily weather information.

Figure 8:
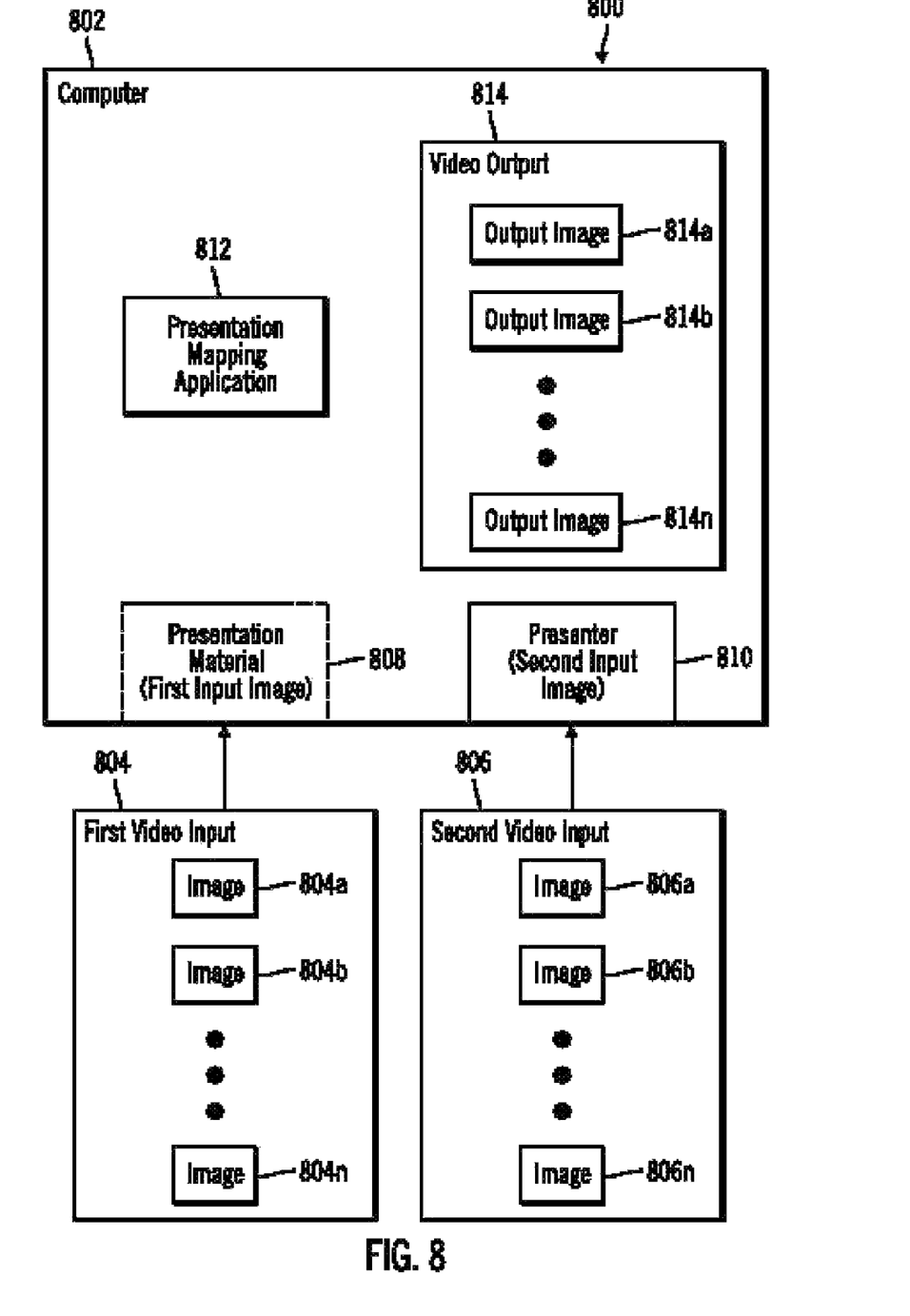
FIG. 8 illustrates a computing environment including a computational device, in accordance with certain embodiments.

FIG. 8 illustrates a computing environment 800 including a computer 802, in accordance with certain embodiments. The computer 802 may be any suitable computational device including those presently known in the art, such as, a personal computer, a workstation, a mainframe, a hand held computer, a palm top computer, a telephony device, a network appliance, a blade computer, etc. The computer 802 receives a first video input 804 and a second video input 806.

The first video input 804 includes a sequence of images 804a, 804b, . . . 804n that arrive at the computer 802. The second video input 804 includes a presentation material 808, such as the weather map 100.

The second video input 806 includes a sequence of images 806a, 806b, . . . 806n that arrive at the computer 802. The second video input 806 includes a presenter 810, such as the weather forecaster 400, who has been imaged standing before a monochromatic background 402.

A presentation mapping application 802 generates a video output 814 from images of the presentation material 808 and the presenter 810. The video output 814 comprises output images 814a, 814b, . . . 814s created from the first video input 804 and the second video input 806. For example, output image 814a may be created from image 804a and image 806a by using embodiments described in FIGS. 1-7.

Figure 9:
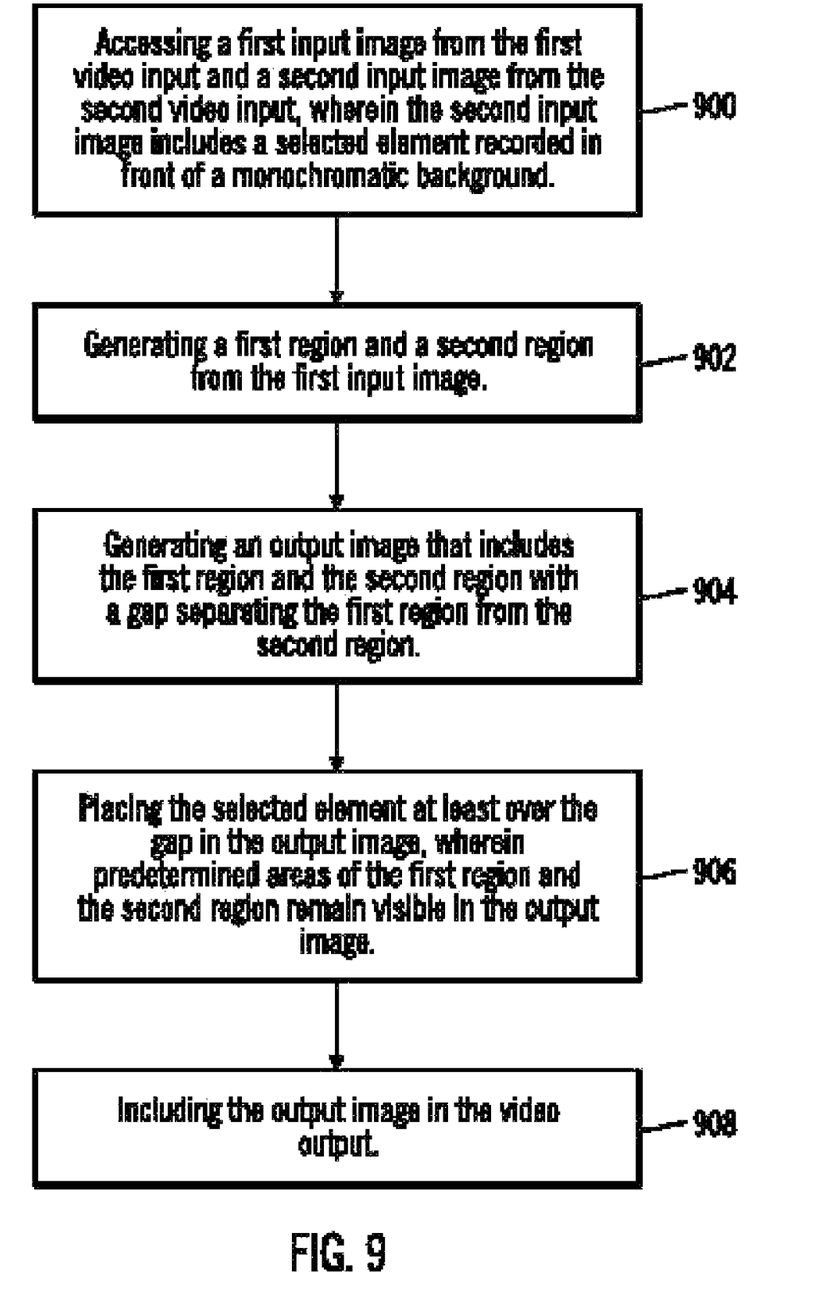
FIG. 9 illustrates a flowchart for the remapping of presentation material around a presenter, in accordance with certain embodiments.

FIG. 9 illustrates a flowchart for remapping of presentation material 808 around a presenter 810, in accordance with certain embodiments. Certain operations implemented in FIG. 9 are implemented in the presentation mapping application 812 in the computer 802.

Control starts at block 900, where the presentation mapping application 812 accesses a first input image 808 from the first video input 804 and a second input image 810 from the second video input 806. The first input image 808 may be the image of a presentation, such as the weather map 100. The second input image 810 includes a selected element, such as a weather forecaster 400 recorded in front of a monochromatic background 402, such as a blue screen.

The presentation mapping application 812 generates (at block 902) a first region and a second region from the first input image 808. For example, in certain embodiments, the first region may be the region to the left 504 of the weather forecaster 500 and the second region may be the region to the right 506 of the weather forecaster.

The presentation mapping application 812 generates (at block 904) an output image 814a that includes the first region and the second region with a gap, such as gap 510, separating the first region from the second region.

The presentation mapping application 812 places (at block 906) the selected element at least over the gap in the output image 814a, wherein predetermined areas of the first region and the second region remain visible in the output image 814a. For example, the southern tip 508 of Texas, may remain visible in an exemplary output image 502 that may correspond to the output image 814a. Control proceeds to block 908, where the presentation mapping application 812 includes the output image 814a in the video output 814. Placement of the selected element in the gap may be performed by integrating the first region, the second region, the selected element, and the gap in many different ways in the output image 814a.

Therefore, FIGS. 1-9 illustrate certain embodiments in which the presenter does not obscure predetermined areas included in the presentation material, and the video output is generated in real time. In certain embodiments, the first region includes a first set of text, such as the texts for the days Monday, Tuesday, Wednesday, and Thursday as shown in FIG. 7 to the left of the weather forecaster 700, and the second region includes a second set of text, such as the text for Friday, where the predetermined areas that remain visible in the output image include the first set of text and the second set of text. In certain embodiments, the image of the presentation material is split into the first region and the second region based on physical features included in the image of the presentation material.

Additional Embodiment Details

The described techniques may be implemented as a method, apparatus or article of manufacture involving software, firmware, micro-code, hardware and/or any combination thereof. The term "article of manufacture" as used herein refers to code or logic implemented in a medium, where such medium may comprise hardware logic [e.g., an integrated circuit chip, Programmable Gate Array (PGA), Application Specific Integrated Circuit (ASIC), etc.] or a computer readable medium, such as magnetic storage medium (e.g., hard disk drives, floppy disks, tape, etc.), optical storage (CD-ROMs, optical disks, etc.), volatile and non-volatile memory devices [e.g., Electrically Erasable Programmable Read Only Memory (EEPROM), Read Only Memory (ROM), Programmable Read Only Memory (PROM), Random Access Memory (RAM), Dynamic Random Access Memory (DRAM), Static Random Access Memory (SRAM), flash, firmware, programmable logic, etc.]. Code in the computer readable medium is accessed and executed by a processor. The medium in which the code or logic is encoded may also comprise transmission signals propagating through space or as transmission media, such as an optical fiber, copper wire, etc. The transmission signal in which the code or logic is encoded may further comprise a wireless signal, satellite transmission, radio waves, infrared signals, Bluetooth, etc. The transmission signal in which the code or logic is encoded is capable of being transmitted by a transmitting station and received by a receiving station, where the code or logic encoded in the transmission signal may be decoded and stored in hardware or a computer readable medium at the receiving and transmitting stations, or devices. Additionally, the "article of manufacture" may comprise a combination of hardware and software components in which the code is embodied, processed, and executed. Of course, those skilled in the art will recognize that many modifications may be made without departing from the scope of embodiments, and that the article of manufacture may comprise any information bearing medium. For example, the article of manufacture comprises a storage medium having stored therein instructions that when executed by a machine results in operations being performed.

Certain embodiments can take the form of an entirely hardware embodiment, as entirely software embodiment or an embodiment containing both hardware and software elements. In a preferred embodiment, the invention is implemented in software, which includes but is not limited to firmware, resident software, microcode, etc.

Furthermore, certain embodiments can take the form of a computer program product accessible from a computer usable or computer readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

The terms "certain embodiments", "an embodiment", "embodiment", "embodiments", "the embodiment", "the embodiments", "one or more embodiments", "some embodiments", and "one embodiment" mean one or more (but not all) embodiments unless expressly specified otherwise. The terms "including", "comprising", "having" and variations thereof mean "including but not limited to", unless expressly specified otherwise. The enumerated listing of items does not imply that any or all of the items are mutually exclusive, unless expressly specified otherwise. The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediates. Additionally, a description of an embodiment with several components in communication with each other does not imply that all such components are required. On the contrary a variety of optional components are described to illustrate the wide variety of possible embodiments.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously, in parallel, or concurrently.

When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article. The functionality and/or the features of a device may be alternatively embodied by one or more other devices which are not explicitly described as having such functionality/features. Thus, other embodiments need not include the device itself.

Figure 10:
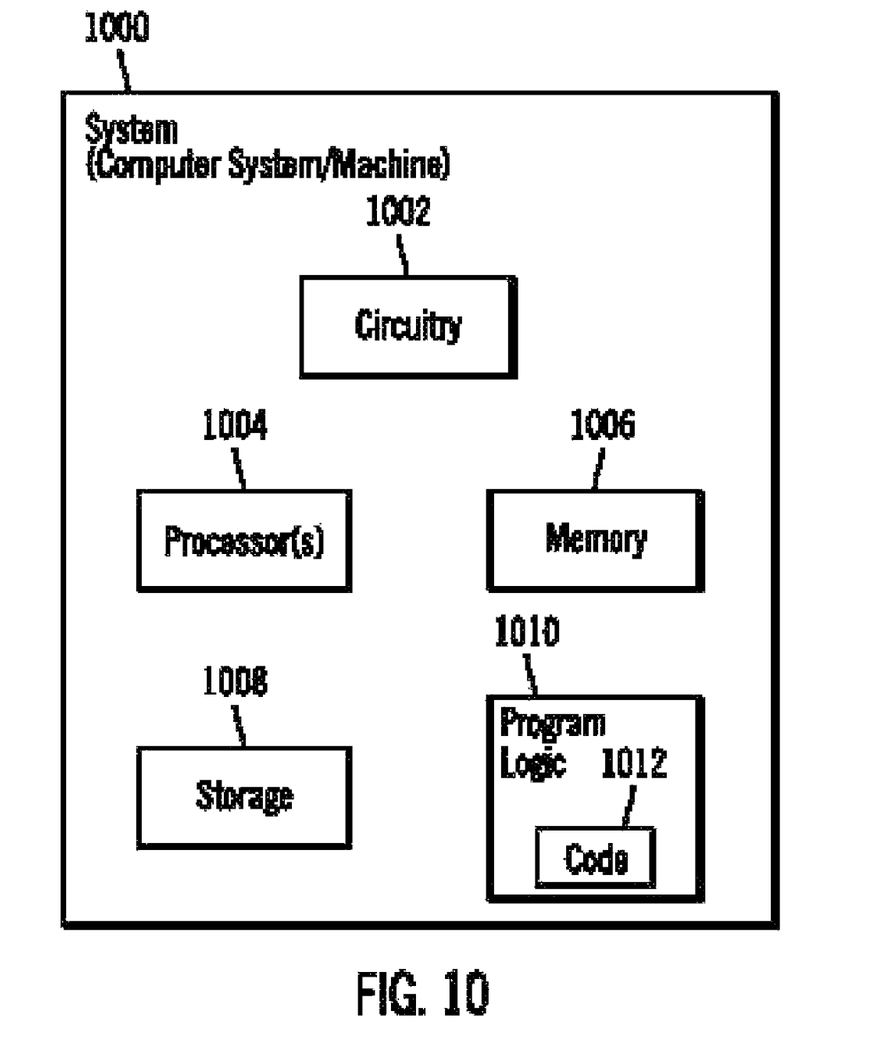
FIG. 10 illustrates the architecture of computing system, wherein in certain embodiments the computational device of the computing environment of FIG. 8 may be implemented in accordance with the architecture of the computing system.

FIG. 10 illustrates the architecture of computing system, wherein in certain embodiments the computational device of the computing environment of FIG. 8 may be implemented in accordance with the architecture of the computing system. The computer system 1000 may also be referred to as a system, and may include a circuitry 1002 that may in certain embodiments include a processor 1004. The system 1000 may also include a memory 1006 (e.g., a volatile memory device), and storage 1008. The storage 1008 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 1008 may comprise an internal storage device, an attached storage device and/or a network accessible storage device. The system 1000 may include a program logic 1010 including code 1012 that may be loaded into the memory 1006 and executed by the processor 1004 or circuitry 1002. In certain embodiments, the program logic 1010 including code 1012 may be stored in the storage 1008. In certain other embodiments, the program logic 1010 may be implemented in the circuitry 1002. Therefore, while FIG. 10 shows the program logic 1010 separately from the other elements, the program logic 1010 may be implemented in the memory 1006 and/or the circuitry 1002.

Certain embodiments may be directed to a method for deploying computing instruction by a person or automated processing integrating computer-readable code into a computing system, wherein the code in combination with the computing system is enabled to perform the operations of the described embodiments.

At least certain of the operations illustrated in FIGS. 1-10 may be performed in parallel as well as sequentially. In alternative embodiments, certain of the operations may be performed in a different order, modified or removed.

Furthermore, many of the software and hardware components have been described in separate modules for purposes of illustration. Such components may be integrated into a fewer number of components or divided into a larger number of components. Additionally, certain operations described as performed by a specific component may be performed by other components.

The data structures and components shown or referred to in FIGS. 1-10 are described as having specific types of information. In alternative embodiments, the data structures and components may be structured differently and have fewer, more or different fields or different functions than those shown or referred to in the figures. Therefore, the foregoing description of the embodiments has been presented for the purposes of illustration and description. It is not intended to be exhaustive or to limit the embodiments to the precise form disclosed. Many modifications and variations are possible in light of the above teaching.

What is claimed is:

1. A method for generating a video output by combining a first video input and a second video input, the method comprising:

accessing, via a processor, a first input image from the first video input and a second input image from the second video input, wherein the second input image includes a selected element recorded in front of a monochromatic background;

in response to the accessing, generating, via the processor, a first region and a second region from the first input image;

in response to the generating of the first region and the second region, generating an output image of a provided screen size that includes a compressed version of the first region and a compressed version the second region with a gap separating the first region from the second region;

in response to the generating of the output image, placing the selected element at least over the gap in the output image, wherein predetermined areas of the first region and the second region remain visible in the output image; and in response to the placing of the selected image at least over the gap, including the output image in the video output, wherein the selected element is an area of that includes text, wherein the generating of the first region and the second region and the placing of the area that includes the text causes that area that includes the text to be mapped around a moving presenter, wherein the text always remain readable to a viewer.

2. The method of claim 1, wherein the first input image comprises a presentation material, wherein the second input image comprises a presenter standing in front of the monochromatic background, wherein the presenter is the selected element included in the second input image, wherein in the output image the presenter does not obscure the predetermined areas included in the presentation material, and wherein the first video input and the second video input are received by a computational device that generates the video output in real time.

3. The method of claim 1, wherein the first region includes a first set of text and the second region includes a second set of text, and wherein the predetermined areas that remain visible in the output image include the first set of text and the second set of text.

4. The method of claim 1, wherein the first input image is split into the first region and the second region based on physical features included in the first input image.

5. The method of claim 1, wherein the compressed version of the first region, the compressed version of the second region, and the gap fit the provided screen size, without loss of visually identifiable features.

6. A system for generating a video output by combining a first video input and a second video input, the system comprising:
   memory; and
   processor coupled to the memory, wherein the processor executes operations, the operations comprising:
   accessing a first input image from the first video input and a second input image from the second video input, wherein the second input image includes a selected element recorded in front of a monochromatic background;
   in response to the accessing, generating, via the processor, a first region and a second region from the first input image;
   in response to the generating of the first region and the second region, generating an output image of a provided screen size that includes a compressed version of the first region and a compressed version the second region with a gap separating the first region from the second region;
   in response to the generating of the output image, placing the selected element at least over the gap in the output image, wherein predetermined areas of the first region and the second region remain visible in the output image; and
   in response to the placing of the selected image at least over the gap, including the output image in the video output, wherein the selected element is an area of that includes text, wherein the generating of the first region and the second region and the placing of the area that includes the text causes that area that includes the text to be mapped around a moving presenter, wherein the text always remain readable to a viewer.

7. The system of claim 6, wherein the first input image comprises a presentation material, wherein the second input image comprises a presenter standing in front of the monochromatic background, wherein the presenter is the selected element included in the second input image, wherein in the output image the presenter does not obscure the predetermined areas included in the presentation material, and wherein the first video input and the second video input are received by a computational device that generates the video output in real time.

8. The system of claim 6, wherein the first region includes a first set of text and the second region includes a second set of text, and wherein the predetermined areas that remain visible in the output image include the first set of text and the second set of text.

9. The system of claim 6, wherein the first input image is split into the first region and the second region based on physical features included in the first input image.

10. The system of claim 6, wherein the compressed version of the first region, the compressed version of the second region, and the gap fit the provided screen size, without loss of visually identifiable features.

11. A computer readable storage medium for generating a video output by combining a first video input and a second video input, wherein code stored in the computer readable storage medium when executed by a processor causes operations, the operations comprising:
   accessing a first input image from the first video input and a second input image from the second video input, wherein the second input image includes a selected element recorded in front of a monochromatic background;
   in response to the accessing, generating, via the processor, a first region and a second region from the first input image;
   in response to the generating of the first region and the second region, generating an output image of a provided screen size that includes a compressed version of the first region and a compressed version the second region with a gap separating the first region from the second region;
   in response to the generating of the output image, placing the selected element at least over the gap in the output image, wherein predetermined areas of the first region and the second region remain visible in the output image; and
   in response to the placing of the selected image at least over the gap, including the output image in the video output, wherein the selected element is an area of that includes text, wherein the generating of the first region and the second region and the placing of the area that includes the text causes that area that includes the text to be mapped around a moving presenter, wherein the text always remain readable to a viewer.

12. The computer readable storage medium of claim 11, wherein the first input image comprises a presentation material, wherein the second input image comprises a presenter standing in front of the monochromatic background, wherein the presenter is the selected element included in the second input image, wherein in the output image the presenter does not obscure the predetermined areas included in the presentation material, and wherein the first video input and the second video input are received by a computational device that generates the video output in real time.

13. The computer readable storage medium of claim 11, wherein the first region includes a first set of text and the second region includes a second set of text, and wherein the predetermined areas that remain visible in the output image include the first set of text and the second set of text.

14. The computer readable storage medium of claim 11, wherein the first input image is split into the first region and the second region based on physical features included in the first input image.

15. The computer readable storage medium of claim 11, wherein the compressed version of the first region, the compressed version of the second region, and the gap fit the provided screen size, without loss of visually identifiable features.

16. A method for mapping a presenter to a presentation material, the method comprising:
   initiating a recording of the presentation into a first video input;
   initiating, via a processor, a recording of the presenter standing in front of a monochromatic background into a second video input;
   accessing, via the processor, a first input image from the first video input and a second input image from the second video input, wherein the second input image includes a selected element recorded in front of a monochromatic background;
   in response to the accessing, generating, via the processor, a first region and a second region from the first input image;
   in response to the generating of the first region and the second region, generating an output image of a provided screen size that includes a compressed version of the first region and a compressed version the second region with a gap separating the first region from the second region;
   in response to the generating of the output image, placing the selected element at least over the gap in the output image, wherein predetermined areas of the first region and the second region remain visible in the output image; and
   in response to the placing of the selected image at least over the gap, including the output image in a video output, wherein the selected element is an area of that includes text, wherein the generating of the first region and the second region and the placing of the area that includes the text causes that area that includes the text to be mapped around a moving presenter, wherein the text always remain readable to a viewer.

17. The method of claim 16, wherein in the output image the presenter does not obscure the predetermined areas included in the presentation material, and wherein the first video input and the second video input are received by a computational device that generates the video output in real time.

18. The method of claim 16, wherein the first region includes a first set of text and the second region includes a second set of text, and wherein the predetermined areas that remain visible in the output image include the first set of text and the second set of text.

19. The method of claim 16, wherein the first input image is split into the first region and the second region based on physical features included in the first input image.

20. The method of claim 16, wherein the compressed version of the first region, the compressed version of the second region, and the gap fit the provided screen size, without loss of visually identifiable features.

* * * * *